United States Patent
Seo et al.

(10) Patent No.: US 9,162,356 B2
(45) Date of Patent: Oct. 20, 2015

(54) METHOD FOR CONTROLLING TWO ARMS OF A ROBOT

(71) Applicant: Hyundai Motor Company, Seoul (KR)

(72) Inventors: Jung Ho Seo, Suwon-si (KR); Woo Sung Yang, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 160 days.

(21) Appl. No.: 13/842,553

(22) Filed: Mar. 15, 2013

(65) Prior Publication Data

US 2014/0172171 A1   Jun. 19, 2014

(30) Foreign Application Priority Data

Dec. 17, 2012  (KR) .................. 10-2012-0147916

(51) Int. Cl.
*B25J 9/00* (2006.01)
*B25J 9/16* (2006.01)
*A63B 21/00* (2006.01)

(52) U.S. Cl.
CPC ........... *B25J 9/1607* (2013.01); *A63B 21/1434* (2013.01); *B25J 9/0006* (2013.01); *B25J 9/0087* (2013.01); *B25J 9/1682* (2013.01); *G05B 2219/40305* (2013.01)

(58) Field of Classification Search
CPC ........ B25J 9/0006; B25J 9/0087; B25J 9/107; A63B 21/1434; B65F 2003/023; G05B 2219/40305; Y10S 901/01
USPC ...................................... 700/260–263; 901/1
See application file for complete search history.

(56) References Cited

U.S. PATENT DOCUMENTS

| | | | | |
|---|---|---|---|---|
| 4,762,455 A | * | 8/1988 | Coughlan et al. | 414/4 |
| 5,101,472 A | * | 3/1992 | Repperger | 700/261 |
| 5,624,398 A | * | 4/1997 | Smith et al. | 604/95.01 |
| 5,765,444 A | * | 6/1998 | Bacchi et al. | 74/490.03 |
| 5,845,540 A | * | 12/1998 | Rosheim | 74/490.05 |
| 5,967,580 A | * | 10/1999 | Rosheim | 294/198 |
| 7,902,784 B1 | * | 3/2011 | Theobald | 318/568.1 |
| 8,112,155 B2 | * | 2/2012 | Einav et al. | 607/48 |
| 8,347,710 B2 | * | 1/2013 | Scott et al. | 73/379.01 |
| 8,977,388 B2 | * | 3/2015 | Jacobsen et al. | 700/228 |
| 2004/0086368 A1 | * | 5/2004 | Downs et al. | 414/741 |
| 2007/0140821 A1 | * | 6/2007 | Garon et al. | 414/618 |

(Continued)

FOREIGN PATENT DOCUMENTS

| | | |
|---|---|---|
| JP | 3765713 B2 | 4/2006 |
| JP | 2008-012358 A | 1/2008 |

(Continued)

OTHER PUBLICATIONS

Korean Office Action issued in Korean Application No. 10-2012-0147916 issued on Dec. 23, 2013.

*Primary Examiner* — Jason Holloway
(74) *Attorney, Agent, or Firm* — McDermott Will & Emery LLP

(57) ABSTRACT

A method of controlling two arms of a robot including: a finding-out step of finding out position differences in axial directions of an end of one arm and an end of the other arm; a generating step of generating a virtual force at the end of the other arm based on the position differences that have been found out; and a converting step of converting the generated virtual force into a driving torque for joints of the other arm, using a Jacobian matrix.

6 Claims, 4 Drawing Sheets

(56) References Cited

U.S. PATENT DOCUMENTS

| | | | |
|---|---|---|---|
| 2009/0210093 A1* | 8/2009 | Jacobsen et al. | 700/260 |
| 2010/0076601 A1* | 3/2010 | Matsuo et al. | 700/261 |
| 2012/0010749 A1* | 1/2012 | Van Der Merwe et al. | 700/264 |
| 2012/0237319 A1* | 9/2012 | Jacobsen et al. | 414/1 |
| 2013/0013108 A1* | 1/2013 | Jacobsen et al. | 700/250 |
| 2013/0278500 A1* | 10/2013 | Kawasaki et al. | 345/156 |

FOREIGN PATENT DOCUMENTS

| | | |
|---|---|---|
| JP | 2012-223829 A | 11/2012 |
| KR | 10-2008-0079590 A | 9/2008 |
| KR | 10-2012-0053894 A | 5/2012 |
| KR | 10-2012-0064410 A | 6/2012 |
| KR | 10-2012-0065470 A | 6/2012 |

* cited by examiner

METHOD FOR CONTROLLING TWO ARMS OF A ROBOT

CROSS-REFERENCE TO RELATED APPLICATION

This application claims under 35 U.S.C. §119(a) the benefit of Korean Patent Application No. 10-2012-0147916 filed on Dec. 17, 2012, the entire contents of which is incorporated herein by reference.

BACKGROUND (a) Technical Field

The present disclosure relates to a method for controlling two arms of a robot that can easily make the two arms level when controlling a wearable robot with the two arms lifting a weight.

(b) Background Art

Wearable muscle force assistive robots are provided for a wearer to lift or move objects while wearing the robot in industrial fields.

When lifting a weight with two arms in accordance with an intention of a wearer, a muscle force assistive wearable robot can help lift the weight because a force is transmitted from the wearer to the robot and the transmitted force is amplified through the robot.

The present disclosure relates to an algorithm for controlling a muscle force assistive wearable robot such that upper arms simultaneously and stably move when lifting a weight. The present disclosure is very useful particularly when lifting an object that is relatively heavy, such that horizontality needs to be maintained.

When existing muscle force assistive wearable robots lift a heavy weight with two arms, the arms simultaneously move by reflecting an intention of a wearer to the arms, respectively.

When lifting a heavy weight with two arms of the robot while keeping the arms level, a wearer has to keep the arms level by separately moving the arms, so that the wearer feels a large amount of fatigue.

Further, the balance of the robots may be rapidly broken, when a heavy weight is inclined to a side. The present disclosure enables synchronizing two arms even in this case such that the heavy weight does not incline to a side, and can therefore be considered as being very useful in the industrial fields.

KR10-2008-0079590 A in the related art has proposed a "friction compensation method, a friction compensator, and a motor control device" in which an actual locator 21 estimates the actual position of a moving object in response to a location signal and generates an actual position signal, a differentiator 22 finds a velocity signal by differentiating the actual position signal, an integrator 24 generates a displacement signal at a position where the moving object changes the movement direction by integrating the velocity signal, an absolute value calculator 25 finds the absolute value, a frictional property estimator 26 finds a rate of change of a friction force or friction torque to the displacement, a multiplier 27 finds a rate of change to time by multiplying the rate of change to the displacement by the velocity signal, and an integrator 28 estimates the friction force or the friction torque by integrating the rate of change to time.

However, there has not been proposed a way of synchronizing two arms lifting a heavy weight, so that a control method that can control even this situation is required in the art.

The description provided above as related art of the present disclosure is just for helping understand the background of the present disclosure and should not be construed as being included in the related art known by those skilled in the art. (Patent Document 1) KR-10-2008-0079590 A

SUMMARY OF THE DISCLOSURE

An object of the present disclosure is to provide a method for controlling two arms of a robot which can easily make the two arms level when controlling a wearable robot with two arms lifting a heavy weight.

A method of controlling two arms of a robot according to an exemplary embodiment of the present disclosure includes: a finding-out step of finding out position differences in axial directions of an end of one arm and an end of the other arm; a generating step of generating a virtual force at the end of the other arm based on the position differences that have been found out; and a converting step of converting the generated virtual force into driving torque for joints of the other arm, using a Jacobian matrix.

The finding-out step may find out the position differences between the ends of the arms in the X axis, Y axis, and Z axis.

The generating step may generate a virtual reacting force through a virtual spring-damper model at the end of the other arm.

The converting step may convert the generated virtual force into the driving torque for the joints of the other arm through a transpose of the Jacobian matrix.

The method may further include an applying step of applying the driving torque to driving units of the joints.

The generating step may generate virtual forces at the respective ends of the one arm and the other arm on the basis of the position differences between the ends of the arms, and the converting step may convert the generated virtual forces into driving torque for the joints of the one arm and the other arm, using the Jacobian matrix.

The finding-out step may find out the positions of the ends of the respective arms from the rotational angles of the joints and finds out the position differences between the arms.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
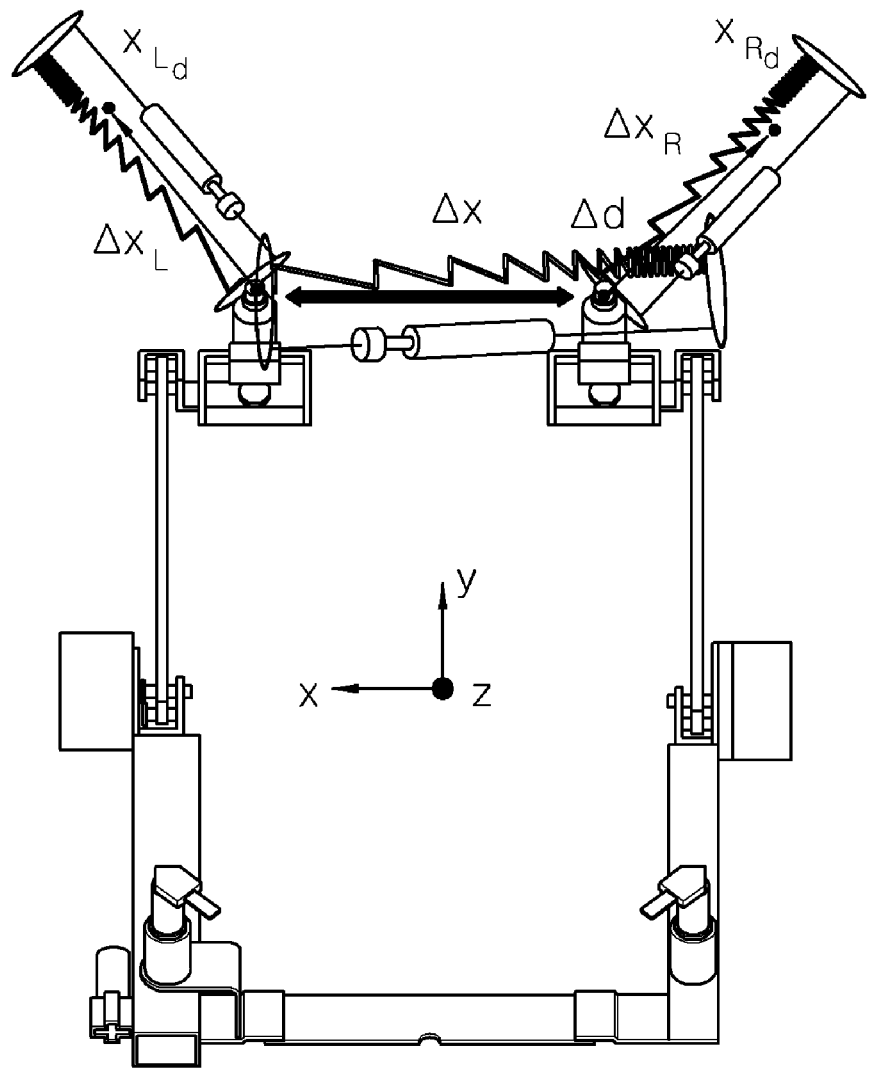
FIGS. 1 to 3 are views showing the status of two arms of a robot to illustrate a method for controlling two arms of a robot according to an exemplary embodiment of the present disclosure.

It should be understood that the appended drawings are not necessarily drawn to scale, presenting a somewhat simplified representation of various preferred features illustrative of the basic principles of the present disclosure. The specific design features of the present disclosure as disclosed herein, including but not limited to, for example, specific dimensions, orientations, locations, and shapes will be determined in part by the particular intended application and use environment.

In the figures, like reference numbers refer to the same or equivalent parts of the present disclosure throughout the several figures of the drawing.

DETAILED DESCRIPTION

A method for controlling two arms of a robot according to an exemplary embodiment of the present disclosure is described hereafter with reference to the accompanying drawings.

Figure 2:
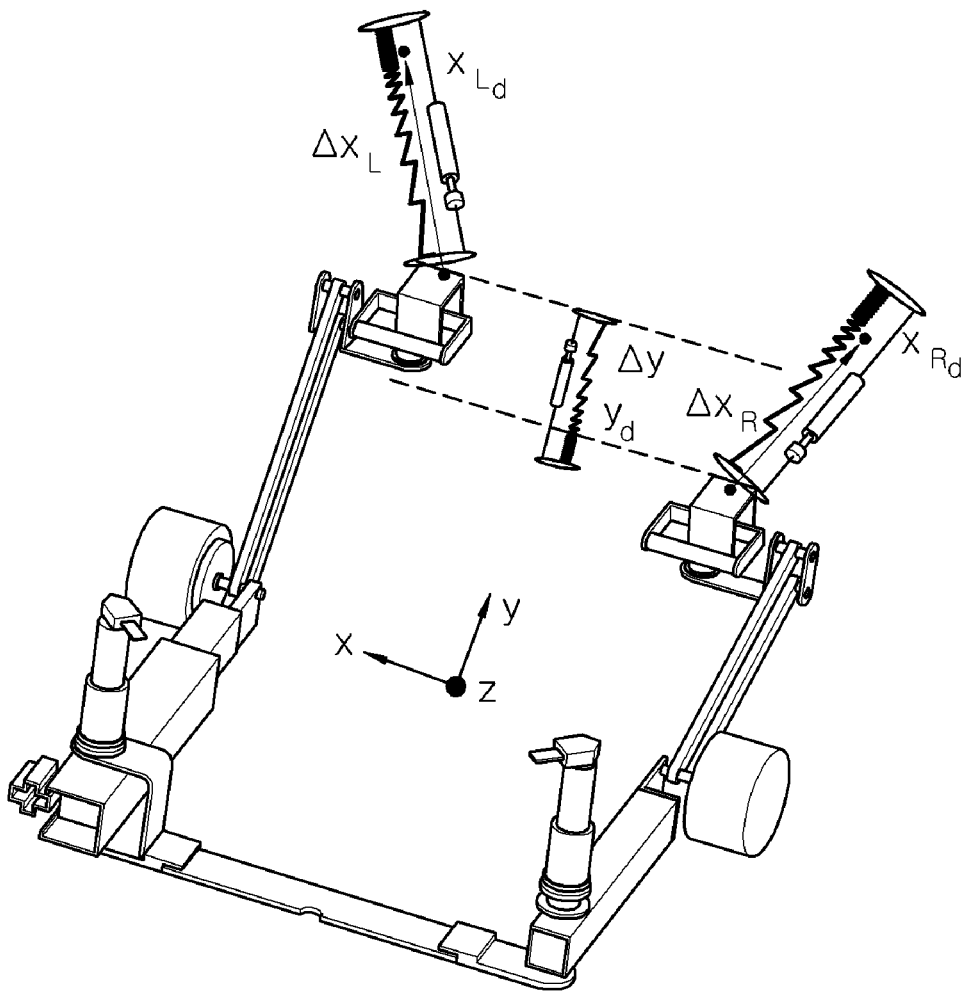
Figure 3:
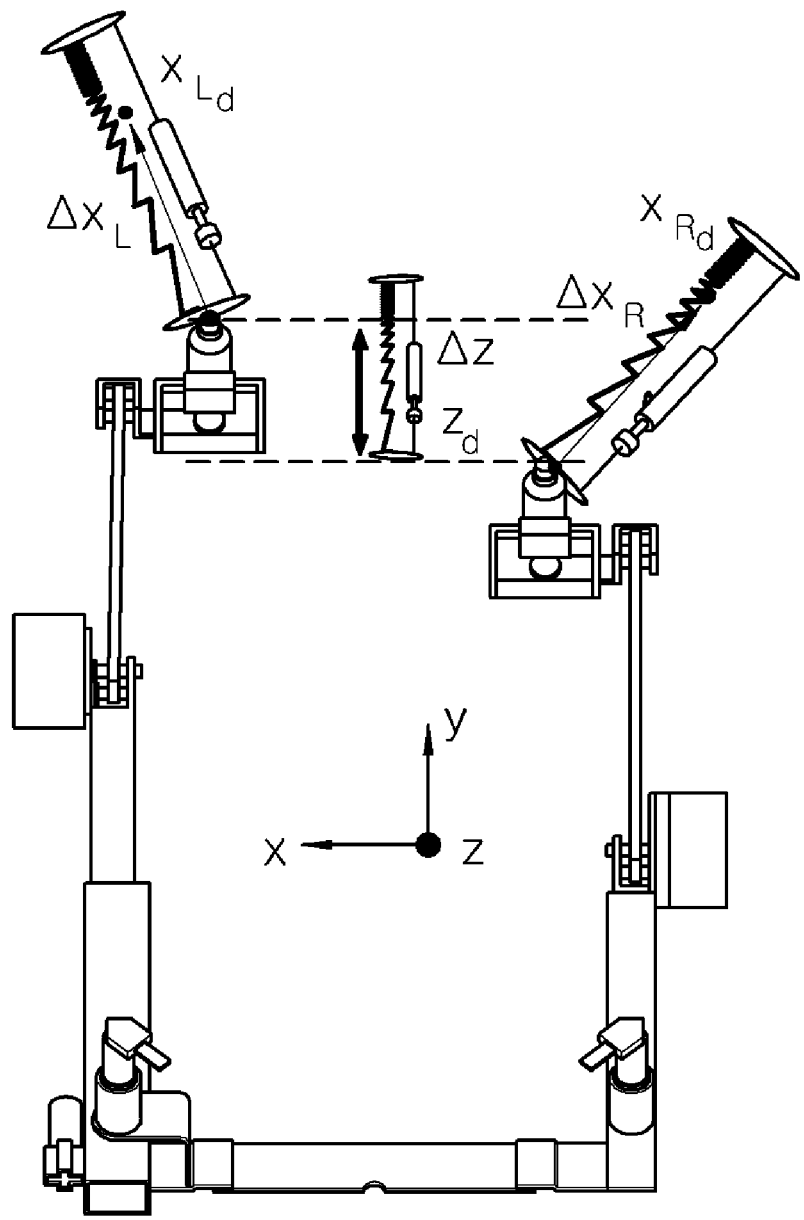
Figure 4:
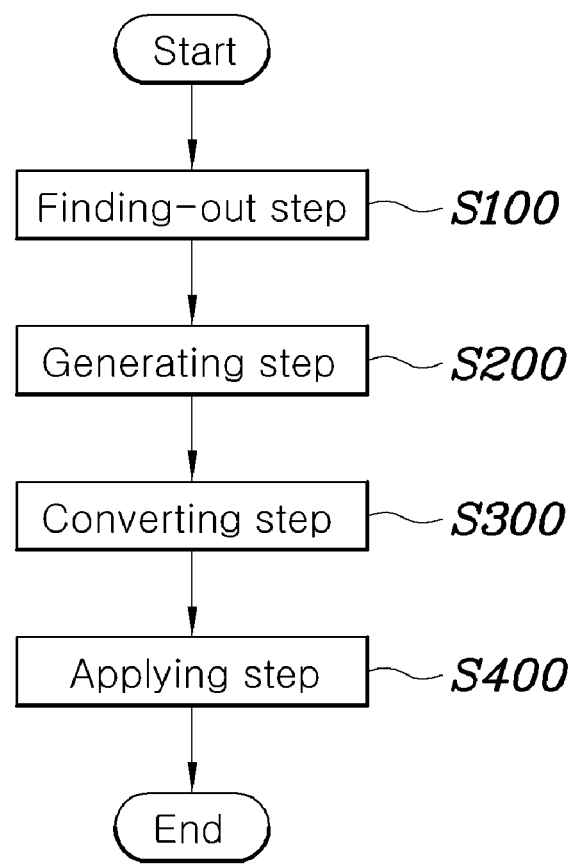
FIG. 4 is a flowchart illustrating a method for controlling two arms of a robot according to an exemplary embodiment of the present disclosure.

FIGS. 1 to 3 are views showing the status of two arms of a robot to illustrate a method for controlling two arms of a robot according to an exemplary embodiment of the present disclosure and FIG. 4 is a flowchart illustrating a method for controlling two arms of a robot according to an exemplary embodiment of the present disclosure.

An exemplary embodiment of a method for controlling two arms of a robot can include: a finding-out step S100 that finds out position differences in axial directions of an end of one arm and an end of the other arm; a generating step S200 that generates a virtual force at the end of the other arm based on the position differences that have been found out; and a converting step S300 that converts the generated virtual force into a driving torque for the joints of the other arm, using a Jacobian matrix.

FIG. 1 shows an X-axial gap $\Delta X$ between two arms of a robot, FIG. 2 shows a Y-axial gap $\Delta Y$, and FIG. 3 shows an Z-axial gap $\Delta Z$.

A robot exemplified in the present disclosure can be a wearable robot with two arms which can be enabled to easily adjust the level of the arms even if it has to drive the other arm when driving one arm.

A wearable robot operates motors, which are driving units, at joints of the robot after finding out a motion of the wearer, so that the wearer may use a large force and get fatigued when attempting to balance the two arms when the arms lose balance while being controlled to lift a heavy weight.

Further, the heavier the object, the easier the robot loses balance when the arms are not leveled, which increases the possibility of a safety accident.

The present disclosure is provided for enabling two arms to be leveled by generating a reacting force at one arm when there is a difference in distance between the arms, in order to help prevent the situation described above.

To this end, the exemplary method performs first the finding-out step S100 that can find out axial position differences at the end of one arm and the end of the other arm.

As shown in the figures, a virtual force controller is disposed at each of the ends of two arms of a robot.

This can be explained by the following equation.

$$\tau_{Left\text{-}Arm} = -C_L \dot{q} - k_{L_0}\Delta q - J^T(K_{L_1}\Delta x_L + c_{L_1}\Delta \dot{x}_L) + g_L(q) - J^T(k\Delta x_g + c\Delta \dot{x}_g) - J^T)k\Delta y_g + c\Delta \dot{y}_g) - J^T(k\Delta z_g + c\Delta \dot{z}_g)$$

Equation 1

As in the equation, the left arm of the robot is provided with a virtual spring-damper model for rotational angles of the joints of the robot. This is for preventing sudden control of the robot and generating a reacting force using the spring. Motors receive input controlled by the spring-damper model and drive the joints.

Further, a virtual spring-damper model is added to an end of the robot. That is, the motion at the end of the robot can be calculated as a force and then converted into a torque applied at the joints by a transpose of a Jacobian matrix.

Therefore, the robot can be controlled by each of unit joint torque $-C_L\dot{q} - k_{L_0}\Delta q$, torque calculated from motion at the end of the robot and converted for the joints, and torque for gravitational compensation $-J^T(k_{L_1}\Delta x_L + c_{L_1}\Delta \dot{x}_L) + g_L(q)$.

Further, torque for synchronizing the left arm and the right arm can be additionally given in accordance with a displacement difference between the left arm and the right arm.

Torque can also be given by a virtual spring-damper model, which is called a virtual chain. That is, a virtual chain of a spring-damper is set at the ends of the right arm and the left arm, respectively, and then the left arm or the right arm is synchronized with the other.

Equation 1 shows an exemplary process of synchronizing a left arm with a right arm by use of the virtual chain.

Therefore, for example, the left arm can be given the torque of joints+torque due to a virtual force at the end of the robot+gravitational compensation+virtual torque due to a displacement difference from the right arm $(-J^T(k\Delta x_R + c\Delta \dot{x}_R) - J^T(k\Delta y_R + c\Delta \dot{y}_R) - J^T(k\Delta z_R + c\Delta \dot{z}_R))$.

To this end, the displacement difference between the ends of the left arm and the right arm, respectively, can be expressed by $\Delta XR$, $\Delta YR$, and $\Delta ZR$ in a rectangular coordinate system, and a virtual spring-damper model can be given, thereby finding out a virtual reacting force due to the displacement difference for each axis. Further, torque for a reacting force can be given to the joints by distributing the reacting force to the joints through a transpose of the Jacobian matrix.

An exemplary method of the present disclosure performs: the finding-out step S100 that finds out position differences in axial directions of the end of one arm and the end of the other arm; the generating step S200 that generates a virtual force at the end of the other arm based on the position differences that have been found out; and the converting step S300 that converts the generated virtual force into a driving torque for the joints of the other arm, using a Jacobian matrix.

Further, the method can perform an applying step S400 that applies the driving torque to driving units of the joints.

Meanwhile, the finding-out step S100 can find out the positions of the ends of the arms from the rotational angles of the joints and can find out the position differences between the arms in a mechanical way.

Further, the finding-out step S100 can generate a virtual reacting force at each axis by finding out the position differences between the arms in the X axis, Y axis, and Z axis, and the generating step S200 can generate a virtual reacting force through the virtual spring-damper model at the end of the other arm.

Further, the converting step S300 can convert the generated virtual reacting forces into driving torques for the joints of the other arm through the transpose of the Jacobian matrix, and adds them up.

The following equation shows a process of synchronizing a right arm with a left arm.

$$\tau_{Right\text{-}Arm} = -C_R\dot{q} - k_{R_0}\Delta q - J^T(K_{R_1}\Delta x_R + c_{R_1}\Delta \dot{x}_R) + g_R(q) - J^T(k\Delta x_L + c\Delta \dot{x}_L) - J^T)k\Delta y_L + c\Delta \dot{y}_L) - J^T(k\Delta z_L + c\Delta \dot{z}_L)$$

Equation 2

As can be seen from the equation, a right arm can basically also receive torque from the spring-damper models at the joints, and the intention of a wearer is reflected by converting the forces from the spring-damper model at the end of the right arm and adding them up, thereby driving the right arm.

Further, gravitation compensation can be implemented by toque at the joints, and the relative displacement of the left arm is put into the virtual spring-damper models, calculated into reacting forces, converted into torque for the joints of the right arm and added up, thereby driving the joints.

Further, the generating step S200 can generate virtual forces at the respective ends of the one arm and the other arm on the basis of the position differences between the ends of the arms, and the converting step S300 can convert the generated virtual forces into driving torque for the joints of one arm and the other arm, using a Jacobian matrix. In this exemplary process, both a left arm and a right arm can be synchronized with each other, in which each of the equations can be used.

According to a method of controlling two arms of a robot having the structure described above, it is possible to easily make two arms level when controlling a wearable robot with two arms lifting a heavy weight.

Further, it is possible to minimize fatigue of a wearer when lifting a relatively heavy weight with two arms and to increase stability by implementing an algorithm of controlling both arms of a wearable robot for lifting the heavy weight with two arms.

Further, by a method of controlling a wearable robot to operate, following an intention of a wearer, in accordance with circumstances, it is possible to control a wearable robot by reflecting the intention of a wearer without the need to additionally mount a sensor, and to simultaneously control two arms regardless of knowing whether there is a heavy weight or what the weight is, as contrasted with existing control methods for wearable robots.

The present disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of controlling two wearable arms of a robot comprising:
    a finding-out step of finding out position differences in axial directions of an end of one arm and an end of the other arm;
    a generating step of generating, by a controller, a virtual force at the end of the other arm based on the position differences that have been found out;
    a converting step of converting the generated virtual force into a driving torque for joints of the other arm, using a Jacobian matrix; and
    an applying step of applying the driving torque to driving units of the joints.

2. The method of claim 1, wherein the finding-out step finds out the position differences between the ends of the arms in the X axis, Y axis, and Z axis.

3. The method of claim 1, wherein the generating step generates a virtual reacting force through a virtual spring-damper model at the end of the other arm.

4. The method of claim 1, wherein the converting step converts the generated virtual force into the driving torque for the joints of the other arm through a transpose of the Jacobian matrix.

5. The method of claim 1, wherein the generating step generates virtual forces at the respective ends of the one arm and the other aim on the basis of the position differences between the ends of the arms, and the converting step converts the generated virtual forces into driving torque for the joints of the one arm and the other arm, using the Jacobian matrix.

6. The method of claim 1, wherein the finding-out step finds out the positions of the ends of the respective arms from the rotational angles of the joints and finds out the position differences between the arms.

* * * * *